United States Patent [19]
Eisenbarth et al.

[11] Patent Number: 5,592,573
[45] Date of Patent: Jan. 7, 1997

[54] METHOD AND APPARATUS FOR DETERMINING MIS-REGISTRATION

[75] Inventors: Christoph Eisenbarth, El Granada; Ira Finkelstein, San Jose; Dennis McGhie, Portola Valley; Edward Panofsky, Woodside, all of Calif.

[73] Assignee: De La Rue Giori S.A., Lausanne, Switzerland

[21] Appl. No.: 320,570

[22] Filed: Oct. 11, 1994

Related U.S. Application Data

[63] Continuation of Ser. No. 926,770, Aug. 6, 1992, abandoned.
[51] Int. Cl.$^6$ .................. G06K 9/32; G06K 9/68
[52] U.S. Cl. .................. 382/294; 382/218; 382/151
[58] Field of Search .................. 382/34, 37, 43, 382/44, 45, 19, 180, 151, 218, 289, 294, 173, 195

[56] References Cited

U.S. PATENT DOCUMENTS

| | | | |
|---|---|---|---|
| 3,748,644 | 9/1973 | Tisdale | 340/149 A |
| 4,197,584 | 4/1980 | Blazek | 364/551 |
| 4,311,914 | 1/1982 | Huber | 250/556 |
| 4,635,293 | 1/1987 | Watanabe | 382/37 |
| 4,783,826 | 11/1988 | Koso | 382/19 |
| 4,852,183 | 7/1989 | Abe et al. | 382/34 |
| 4,858,128 | 8/1989 | Nowak | 364/413.13 |
| 4,982,439 | 1/1991 | Castelaz | 382/30 |
| 5,086,486 | 2/1992 | Yamada | 382/53 |

FOREIGN PATENT DOCUMENTS

| | | | |
|---|---|---|---|
| 0197734 | 10/1986 | European Pat. Off. | H04N 1/10 |
| 0440137 | 8/1991 | European Pat. Off. | G07D 7/10 |
| 0449336 | 10/1991 | European Pat. Off. | H04N 1/387 |
| 0485051 | 5/1992 | European Pat. Off. | G06K 9/20 |

OTHER PUBLICATIONS

Patent Abstracts of Japan; vol. 7, No. 113 (M–221) 10 Jun. 1983 & JP-A-58 049 262 (Dainippon Insatsu KK) 23 Mar. 1983.

European Search Report No. EP 93 81 0534; Communication No. 93810534.3–dated Nov. 5, 1993.

*Primary Examiner*—Jose L. Couso
*Assistant Examiner*—Matthew C. Bella
*Attorney, Agent, or Firm*—Kane, Dalsimer, Sullivan, Kurucz, Levy, Eisele and Richard, LLP

[57] ABSTRACT

An image processing apparatus includes a data acquisition stage for acquiring data representative of several spatially separated regions of a sample. The apparatus also includes data storage means for storing reference data corresponding to the sample data. The two sets of data are compiled and analyzed to determine if the sample is shifted from a nominal position.

7 Claims, 2 Drawing Sheets

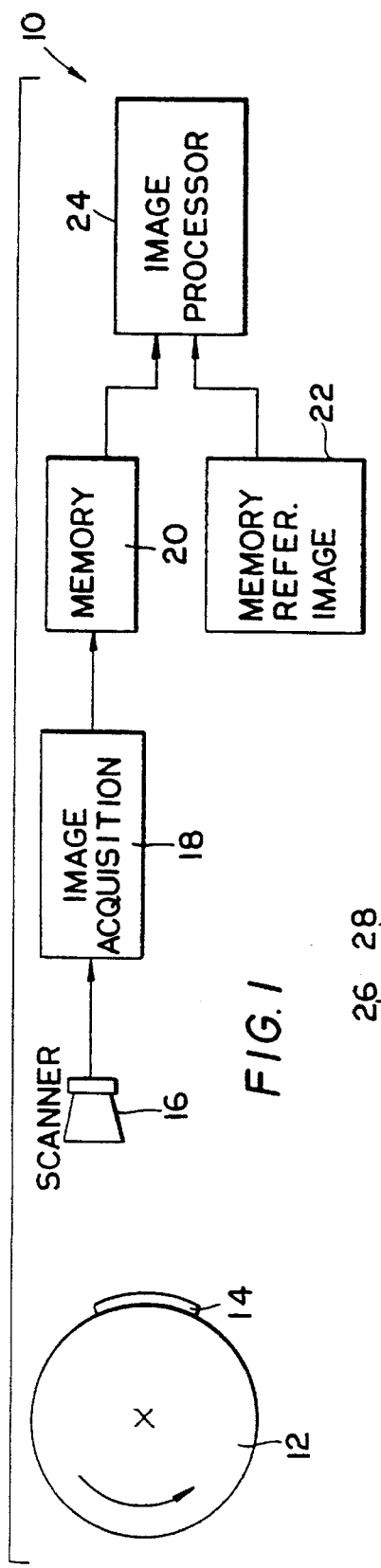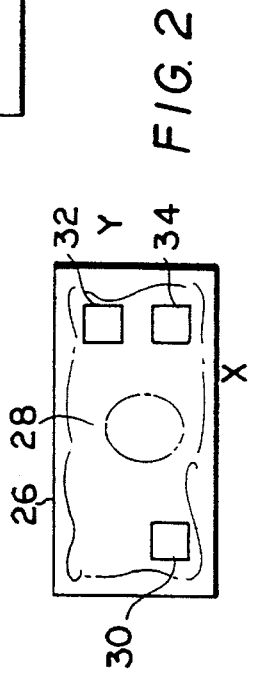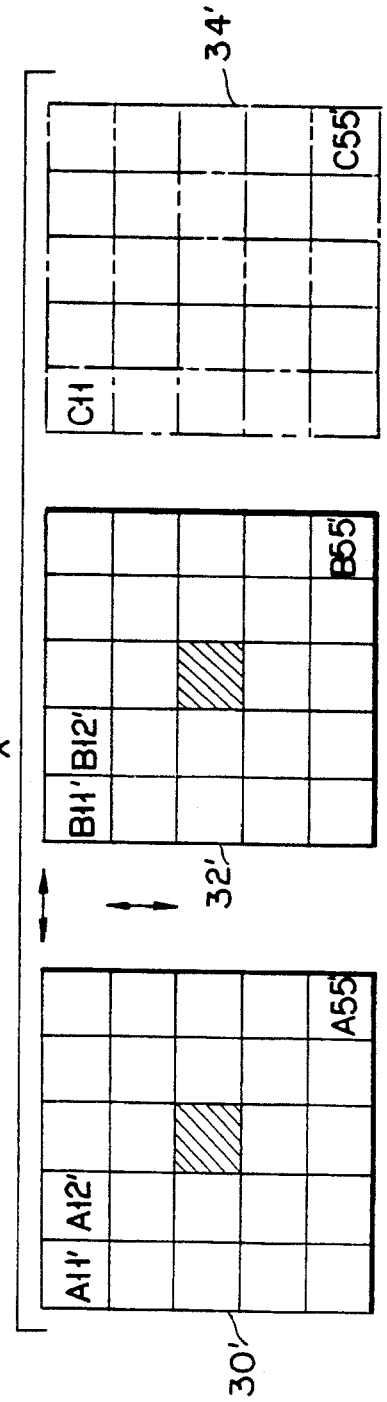
FIG. 1
FIG. 2
FIG. 3

METHOD AND APPARATUS FOR DETERMINING MIS-REGISTRATION

This application is a continuation of application Ser. No. 07/926 770, filed Aug. 6, 1992, now abandoned.

BACKGROUND OF THE INVENTION a. Field of the Invention

This invention relates to an electronic image processing device which uses automatic image registration techniques and equipment for assuring valid registration of the images and more particularly to an apparatus in which several regions are used for the comparison.

b. Description of the Prior Art

Many image processing steps require two or more images to be mutually aligned, based on the content of the images. Several methods exist to determine the amount of mis-registration, and to utilize the detected mis-registration to re-register images for further processing. The simplest re-registration technique is to shift the image data of one or more images to align with a single reference image. The amount of shift used is detected by the quantitative mis-registration detection.

Quantitative mis-registration detection methods currently in use include edge recognition, point recognition, correlation of row and column sums, correlation of local regions and others. These methods are useful in many situations, but have limitations due to accuracy, computation complexity, and limited application in certain image situations.

Another quantitative mis-registration detection method performs a comparison of a test image local region with a reference image local region by summing the absolute value of the difference of the two local regions, on a pixel-by-pixel basis. One of the two local regions is then shifted along the X axis by one pixel and the summation performed again. This operation is repeated a number of times and the summation result recorded for each position. The X axis shift amount is then returned to the original point and the region is shifted along the Y axis by one pixel. The X axis shifting and summation is then repeated for this new Y axis position. This Y axis shifting, and subsequent X axis shifting and summing is repeated a number of times. The recorded summation results are then examined and the minimum value noted. The minimum summation result corresponds to the pixel shift that best aligns the features within the local region.

The amount of shifting is determined by the expected maximum mis-registration amount, and is centered about the nominal position. The size and position of the local region is selected to include an image feature which has significant contrast and non-repeating information content in both the horizontal and vertical directions.

This mis-registration detection method is similar in operation to unnormalized correlation of local regions, but requires much simpler computations as no multiplications are needed.

OBJECTIVES AND SUMMARY OF THE INVENTION

It is an object of the invention to provide method and means to detect mis-registration of test images with respect to a reference image.

Another objective of the present invention is to provide a method and apparatus which may readily be adapted to several misalignment detection processes.

A limitation of the unnormalized correlation of local regions and the minimum of sums of absolute differences of local regions methods is that, for real world objects, there may not be a local region with sufficient contrast and non-repeating information content in both the horizontal and vertical directions. In the present invention local region comparison is performed using two or more local regions from a reference image and two or more local regions from the test image. The local regions are selected to include approximately orthogonal information content in the two local regions. The information in the two local regions is spatially linked, but may be widely separated within the image frame. To use this concept with the sum of absolute differences method, a summation of the absolute value of the difference of one of the local regions in the reference image and the corresponding local region in the test image, on a pixel-by-pixel basis is performed. Then the sum of the absolute differences of the other local region in the reference image and the corresponding local region in the test image is performed. These two sums are then added to each other and the result recorded. The two local regions in the reference image are then shifted along the X axis by one pixel with respect to the test image and the two summations and final sum performed again. This operation is repeated a number of times and the sum of summations recorded for each position. The X axis shift amount is then returned to the original point and the regions are shifted along the Y axis by one pixel. The X axis shifting and sum of summations is then repeated for this new Y axis position. This Y axis shifting, and subsequent X axis shifting and summing is repeated a number of times. The minimum sum of summations result corresponds to the pixel shift that best aligns the features within the two local regions.

The concept of using two local regions from a reference image to compare against two local regions from a test image can be extended to the unnormalized correlation of local regions method of mis-registration determination. The operation is the same as the previously described two region minimum of sums of absolute differences method, except that a sum of products is performed at each X and Y axis shift position for each local region, the sums added, and the result recorded. When all shifts have been completed, the recorded results are examined and the maximum value corresponds to the pixel shift that best aligns the features within the two local regions.

The concept of using two local regions from a reference image to compare against two local regions from a test image using correlation, minimum of sums of the absolute differences, or other comparison method, can be extended to use any number of local regions from a reference image to compare against the same number of local regions from a reference allows including multiple spatially linked features in the comparison, thus ensuring a robust mis-registration determination.

BRIEF DESCRIPTION OF THE DRAWINGS

FIG. 1 shows an image acquisition system constructed in accordance with this invention;

FIG. 2 shows an object being scanned by the system of FIG. 1;

FIG. 3 shows several local regions of a reference region; and

DETAILED DESCRIPTION OF THE INVENTION

Figure 4:
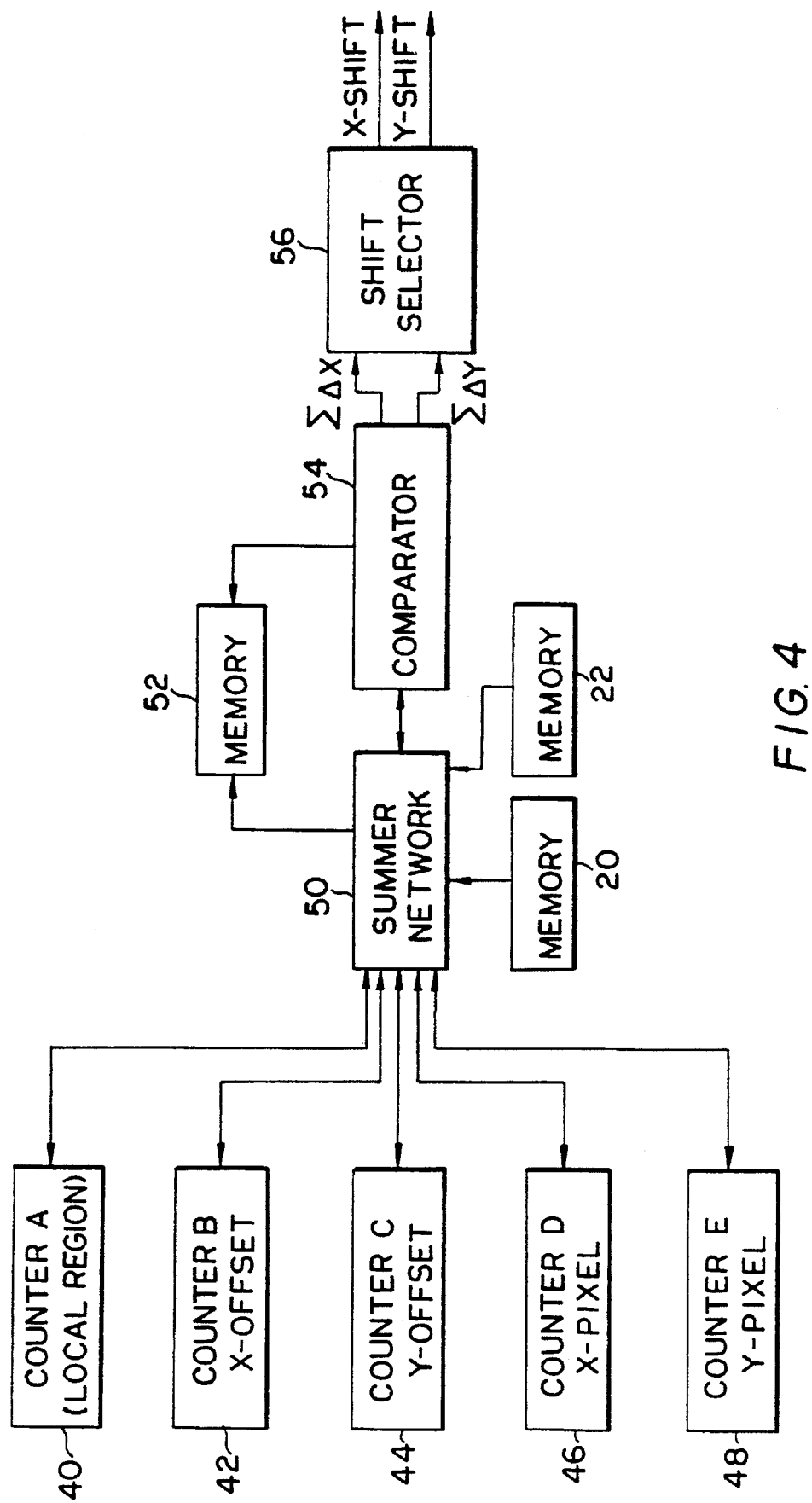
FIG. 4 shows the elements of the image processor of the system of FIG. 1.

The image acquisition system disclosed herein is particularly suited for an apparatus for checking printed patterns. The system 10 may include for example a rotating drum 12 which carries a sheet 14 past a scanner 16. Sheet 14 may be imprinted with a plurality of printed patterns arranged in a rectangular array.

Scanner 16 is used to scan sheet 14 to produce an image of thereof for image acquisition means 18. The image of the sheet 14, or at least portions of the sheet are loaded in a digital form from means 18 to a memory 20.

Apparatus 10 also includes another memory 22, used to store the image of a reference sheet. The two images from memories 20 and 22 are provided to an image processor 24 which is used to determine if the image from scanner 16 has been shifted in one or both orthogonal directions.

FIG. 2 shows a printed pattern banknote 26 from sheet 14 bearing an image 28. In order to determine whether the image 28 has been shifted, three local areas 30, 32, 34 are selected and analyzed as follows. The three local areas may be chosen arbitrarily, however preferably they are selected to contain prominent features extending either in one of two orthogonal directions X or Y. For the purposes of this discussion an image 28 is assumed to have been produced from a single plate, for example by offset printing. Frequently, the a printed pattern is printed with several superimposed images, each image being generated by a different printing method. In such situations, the steps presented here are repeated for each image so that the orthogonal shift of each image may be determined.

Each local image area 30, 32, 34 preferably comprises a two dimensional array of pixels. Memory 22 may contain either a complete reference image, or local areas of the reference image corresponding to the local areas 30, 32, 34. These local reference areas are illustrated in FIG. 3 by three pixel arrays 30', 32', 34'. Advantageously each pixel of the local arrays may be represented as a two dimensional coordinate. For example, the pixel at the upper left hand corner of arrays 30', 32', 34' can be referred to as pixels A11', B11' and C11' respectively. Originally, it is assumed that the local areas of the actual image 28 coincide exactly with the local areas of the reference image. In other words, it is assumed that center pixel of region 30' (shaded in FIG. 3) coincides with the center pixel of region 30.

As shown in more detail in FIG. 4, the image processor 24 includes five counters 40, 42, 44, 46, 48, a summer network 50, a memory 52, a comparator 54 and a shift selector 56. It should be understood that the image processor of FIG. 4 is preferably implemented as a digital computer and the components shown in the Figure are shown for illustrative purposes.

In order to determine if the actual image from memory 20 is shifted orthogonally with respect to the reference image of memory 22, a reiterative process is performed as follows. Counter 40 sequentially designates one of the local regions 30', 32' 34' of the reference image to the summer network 50. Initially counters 42, 44 are set to zero indicating that no shift has yet occurred. Counters 46 and 48 are used as pointers to indicate to the network 50 which pixel of an array is to be processed. After the counter 40 designates the first local region 30', the summer network 50 obtains the values of each pixel of region 30 and takes the absolute value of the difference of the value of each pixel of array 30 and array 30'. Thus, the summing network 50 calculates the differences |A11−A11'|, |A12−A12'| and so on. These differences are summed and stored. The first position of a results array in memory 52 and in a "best match" location also in memory 52. When the differences for all the pixels of arrays 30 and 30' have been calculated and stored, counter 40 is incremented and the whole process is repeated for arrays 32, 32' with the difference from each pixel being summed with the difference of the calculation for the same position for arrays 30, 30'. In other words, for the second set of arrays 32, 32', the summing network 50 first obtains the difference B11−B11' and adds this difference to the difference A11−A11'. The same process is repeated for each of the other pixels of arrays 32, 32' under the direction of counters 46, 48. Finally, the same process is again repeated for the third set of arrays 34, 34'. Once the calculations are completed, counter 42 is incremented by one to indicate that the reference arrays 30', 32' and 34' must be offset along the x-axis by one pixel. The summer network 50 again performs the above-described process, but this time the pixels of the reference image are offset so that for example the difference A12−A11' is calculated and stored temporarily until the calculations for all the three sets of arrays are completed. Comparator 54 then compares the resulting value with the value resulting with no shift. This value is placed in the second position in the results array in memory 52. In addition each shift in the X- and Y-direction as indicated by counters 42 and 44 are also provided to a shift selector 56, as indicted in FIG. 4. If the new results meet certain criteria (i.e. they are equal to or smaller than the old results) the old value in the best match location in memory 52 is replaced with the new ones. If the results are replaced, the shifts in the X and Y direction as indicated by counters 42, 44 are also stored in memory 52. The arrays 30' 32' 34' are then shifted again and the whole process is repeated. The three arrays 30' 32' 34' are shifted a predetermined number of times to the left and right of the original position. Thereafter, the arrays are also shifted up and down a preselected number of times.

When all the shifts and calculations are completed, memory 52 contains the results array showing the values due to the orthogonal shiftings, and the best match value and the amount of shift in the X and Y direction which generated this result. This information is provided to shift selector 56 which selects the pair of shifts in the X- and Y direction corresponding to the best match value as indentified previously and generates a corresponding X- and Y- shift indicating the orthogonal offset of image 28 from a reference image. The results array of summations in memory 52 may be used as a quantitative measure which may be used to determine the level of confidence in the process.

In the embodiment described above, three local areas are used for illustrative purposes. It should be understood that any number of such areas may be used higher than one. Moreover, other criteria for comparing the image and reference arrays without departing from the scope of the invention as defined in the appended claims.

We claim:

1. An image processing apparatus for assuring valid registration of images comprising:

image acquisition means for acquiring data corresponding to an image, said image acquisition means including means for picking at least two local regions of a sample image, said local regions being spatially linked by a predetermined amount, each local region being represented as a two dimensional array of pixels;

storage means for storing at least two local regions of a reference image corresponding to said local regions of said sample image;

compiling means for compiling information from all of said local regions of said sample image and said reference image, said compiling means including summing means for summing data representative of a pixel from one sample array with data representative of a pixel from another sample array; and analyzing means for anaylzing the compiled information to determined if said image is shifted from a nominal position, to thereby determine mis-registration of said sample image;

means for storing said summed array;

means for shifting said sample arrays; and means for comparing a new summed array obtained from said shifted sample arrays to the stored summed array.

2. The apparatus of claim 1 wherein said information from said local regions and said reference image are arranged in a two dimensional array of pixels.

3. The apparatus of claim 2 further comprising shifting means for shifting information from said local regions selectively in one of two orthogonal directions.

4. An image processing apparatus for assuring valid registration of images comprising:

image acquisition means for acquiring data from several local regions of a sample image, said image acquisition means including means for picking at least two local regions of a sample image, said local regions being represented by arrays of pixels, each array being disposed at preselected distances;

memory means for storing at least two sets of reference arrays of pixels;

comparing means for comparing said sample and said reference arrays;

summing means for summing data from said comparing means to obtained summed data, said summed data including information from said several arrays;

compiling means for compiling said summed data; and analyzing means for determining shifts between said sample and reference arrays, thereby to determine mis-registration of said sample;

means for storing said summed array;

means for shifting said sample arrays; and means for comparing a new summed array obtained from said shifted sample arrays to the stored summed array.

5. The system of claim 4 wherein said apparatus further includes shifting means for shifting one of said references arrays and said sample arrays in a predetermined direction.

6. A method of assuring valid registration of a sample image by determining a linear shift of a sample from a nominal position comprising the steps of:

acquiring data corresponding to an image, arranged in several arrays of pixels, each array corresponding to a local region of said sample, said regions being in a predetermined spatial linked relationship with each other, said step of acquiring image data including the step of picking at least two local regions of a sample image;

comparing said sample arrays to at least two corresponding reference arrays to obtained a comparison array for each sample array, each element of the comparison array corresponding to a difference between a sample array element and a corresponding reference array element;

summing said comparison arrays to obtain a summed array, said summed array including summed array elements, each element corresponding to the sum of an element from one comparison array corresponding to one local region and an element from another comparison array corresponding to another local region;

storing said summed array;

shifting said sample arrays; and comparing a new summed array obtained from said shifted sample arrays to the stored summed array.

analyzing means for determining shifts between said sample and reference arrays.

7. The method of claim 6 wherein said sample and reference arrays are analyzed on a pixel-by-pixel basis.

* * * * *